Patented Oct. 10, 1950

2,524,827

UNITED STATES PATENT OFFICE 2,524,827

HALOGEN SUBSTITUTED POLYCYCLIC ARYL ALIPHATIC ACIDS

Domenick Papa, Brooklyn, N. Y., and Erwin Schwenk, Montclair, N. J., assignors to Schering Corporation, Bloomfield, N. J., a corporation of New Jersey No Drawing. Application May 13, 1948, Serial No. 26,916

15 Claims. (Cl. 260—520)

The present invention relates to new polycyclic halogen-substituted aryl aliphatic acids and their ethers and esters. A principal object of the invention is the provision of chemotherapeutically active compounds characterized by high amebicidal and bactericidal properties and by low oral toxicity. In addition, the iodine compounds of the invention are valuable as X-ray diagnostic agents. An important feature of the compounds of this invention is the relative non-absorbability of the compounds through the intestinal tract of animals and man. This property enhances their value as antiamebics and as teniafuges. Their antibacterial action is particularly important in amebiasis complicated by bacterial infection.

The compounds of the present invention may be represented by the general formula:

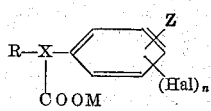

wherein R is a polycyclic radical, X is an aliphatic radical of two carbon atoms, Z is hydroxyl and groups convertible thereto by hydrolysis, Hal is halogen, $n$ is 1 to 3, and M is hydrogen, a lower alkyl group, or an alkali or alkaline earth metal. In general, the halogen atoms are in ortho and para position with respect to Z.

In general, the compounds of the invention may be prepared in accordance with the Perkin or modified Perkin reactions. For example, an alkali metal salt of α-naphthaleneacetic acid, such as the potassium or sodium salt, is heated with p-hydroxybenzaldehyde in the presence of an organic dehydrating agent such as acetic anhydride until condensation has taken place. The resulting α-(1-naphthyl)-4-hydroxycinnamic acid is then purified by any of the conventional methods. Reduction to the corresponding propionic acid by known methods and iodination yields the α-(1-naphthyl)-β-(3,5-diiodo-4-hydroxyphenyl)propionic acid. Chlorination or bromination of the propionic acid gives the corresponding 3,5-dichloro- and 3,5-dibromo- compounds, respectively. In place of α-naphthaleneacetic acid, there can be used the corresponding β-compound, the ar-tetrahydro derivatives, as well as diphenyl-4-acetic acid and other polycyclically substituted acetic acids. Aromatic aldehydes which can be used are hydroxybenzaldehydes, halogenated hydroxybenzaldehydes, alkoxy- and acyloxy-substituted benzaldehydes, as well as alkoxy- and acyloxy-halogenated benzaldehydes.

The tetrahydronaphthyl derivatives may be made by either of the following methods:

1. Formation of the α-(tetralyl)-β-(hydroxyphenylpropionic acids by Raney alloy reduction of the α-(naphthyl) hydroxycinnamic acids.
2. Condensation of the tetralylacetic acids with aromatic aldehydes of the types referred to above to the α-(tetralyl) hydroxycinnamic acids and then reduction to the propionic acids by any of the known methods.

The propionic acids thus obtained may then be chlorinated, brominated or iodinated.

The compounds of the invention may be used in the form of the free acids or in the form of the alkali or alkaline earth salts or the lower alkyl esters of the acids.

Similar series of compounds can be obtained with the β-substituted acids and any desired arrangement and substitution of halogen can be made.

The following examples are illustrative of the methods and products of the invention:

EXAMPLE I

*α-(1-Naphthyl)-3,5-diiodo-4-hydroxycinnamic acid*

A mixture of 0.1 mole of anhydrous potassium α-naphthylacetate, 0.1 mole 3,5-diiodo-4-hydroxybenzaldehyde and 200 cc. acetic anhydride is heated at 105–115° C. with stirring for 8–10 hours. After cooling to about 60° C., the anhydride is decomposed with water and the reaction mixture poured into one liter of 5% hydrochloric acid. After standing overnight, the semi-solid or solid cake is dissolved in sodium carbonate, and the alkaline solution is treated with charcoal and filtered. The diiodo acid is purified by recrystallization from aqueous ethanol and melted at 231.5–232.5° C.

EXAMPLE II

*α-(1-Naphthyl)-3,5-dibromo-4-hydroxycinnamic acid*

This compound is obtained from anhydrous potassium α-naphthylacetate and 3,5-dibromo-4-hydroxybenzaldehyde by the procedure of Example I. After recrystallization from aqueous alcohol, the substituted cinnamic acid melts at 258.5–259.5° C.

EXAMPLE III

*α-(1-Naphthyl)-3,5-dichloro-4-hydroxycinnamic acid*

This compound is obtained from anhydrous potassium α-naphthylacetate and 3,5-dichloro-4-hydroxybenzaldehyde by the procedure of Example I. After recrystallization from aqueous alcohol, the substituted cinnamic acid melts at 252.5–253.5° C.

EXAMPLE IV

*α-(2-Naphthyl)-3,5-dibromo-4-hydroxycinnamic acid*

By substituting anhydrous potassium β-naphthylacetate for the α-compound of Example II, this acid is obtained, melting at 234.8–235.8° C. after recrystallization from aqueous alcohol.

The compound may also be obtained as follows: A mixture of 0.1 mole of β-naphthaleneacetic acid, 0.1 mole of 3,5-dibromo-4-hydroxybenzaldehyde, 0.1 mole of anhydrous triethylamine and 200 cc. of acetic anhydride is heated for 20 hours at 105–115° C. The reaction mixture is then worked up as described in Example I and recrystallized from aqueous alcohol.

EXAMPLE V

*α-(1-Naphthyl)-2,4,6-triiodo-3-hydroxycinnamic acid*

0.03 mole of potassium α-naphthylacetate and 0.03 mole of 2,4,6-triiodo-3-hydroxybenzaldehyde in 80 cc. of acetic anhydride are condensed as described in Example I. The reaction mixture is worked up by the ether-sodium carbonate extraction method and the substituted cinnamic acid obtained melts at 209–211° C. Recrystallized from acetone-water mixture, the product is obtained in the form of a pale yellow material melting at about 212–214° C. with decomposition.

EXAMPLE VI

*α-(2-Naphthyl)-3,5-diiodo-4-hydroxycinnamic acid*

The procedure of Example IV with 3,5-diiodo-4-hydroxybenzaldehyde yields this compound which is a white crystalline solid after recrystallization from ethanol, melting at 233–235° C.

EXAMPLE VII

*α-(5,6,7,8-Tetrahydro-1-naphthyl)-3,5-dibromo-4-hydroxycinnamic acid*

Condensation of anhydrous potassium ar-α-tetralylacetate and 3,5-dibromo-4-hydroxybenzaldehyde yields the compound of this example melting at 229–230° C. after recrystallization from aqueous alcohol.

EXAMPLE VIII

*α-(1-Naphthyl)-3-chloro-4-hydroxycinnamic acid*

This compound is obtained by the condensation of 3-chloro-4-hydroxybenzaldehyde and anhydrous potassium α-naphthylacetate as described in the preceding examples. After recrystallization from aqueous alcohol, the compound melts at about 210–212° C.

EXAMPLE IX

*α-(1-Naphthyl)-β-(3,5-diiodo-4-hydroxyphenyl)-propionic acid*

The intermediate, α-(1-naphthyl)-β-(p-hydroxyphenyl)-propionic acid, is made as follows: The condensation of anhydrous potassium α-naphthylacetate and p-hydroxybenzaldehyde in acetic anhydride gives α-(1-naphthyl)-p-hydroxycinnamic acid melting at 216–216.5° C. after recrystallization from aqueous acetone. Reduction of the cinnamic acid with either sodium amalgam in dilute alkali or with Raney's catalyst gives the α-(1-naphthyl)-β-(p-hydroxyphenyl)-propionic acid melting at 161.162° C. after recrystallization from benzene-petroleum ether.

Iodination of the propionic acid proceeds as follows: To 14.6 g. (0.05 mole) of the propionic acid in 400 cc. N/2 sodium hydroxide solution, there is added with stirring a solution of 25.4 g. of potassium iodide and 25.4 g. of iodine in 150 cc. water. After the addition is completed, the solution is allowed to stand for 1–2 hours at room temperature, filtered and then acidified with sulfurous acid followed by hydrochloric acid. The crude diiodo acid is then purified by dissolving in sodium bicarbonate, acidifying and after recrystallizing from chloroform-petroleum ether it melts at 179–180° C.

EXAMPLE X

*α-(5,6,7,8-Tetrahydro-1-naphthyl)-β-(3,5-diiodo-4-hydroxyphenyl)-propionic acid*

The intermediate, α-(5,6,7,8-tetrahydro-1-naphthyl)-β-(p-hydroxyphenyl)-propionic acid, is made as follows: Condensation of anhydrous potassium ar-α-tetralylacetate and p-hydroxybenzaldehyde gives α-(5,6,7,8-tetrahydro-1-naphthyl)-p-hydroxycinnamic acid, M. P. 221–222° C. after recrystallization from ligroin (70–90° C.). Reduction by the methods outlined in Example IX gives the substituted propionic acid melting at 175–176° C. after recrystallization from benzene-petroleum ether.

Iodination of the propionic acid as described in Example IX gives the diiodo acid as a pale yellow, crystalline solid from chloroform-petroleum ether or ether-petroleum ether.

EXAMPLE XI

*α-(p-Diphenyl)-β-(3,5-diiodo-4-hydroxyphenyl)-propionic acid*

The intermediate, α-(p-diphenyl)-β-(p-hydroxyphenyl)-propionic acid, is made as follows: The Perkin condensation of diphenyl-4-acetic acid as the anhydrous potassium salt with p-hydroxybenzaldehyde gives α-(p-diphenyl)p-hydroxycinnamic acid melting at 226–227° C. after recrystallization from ethyl alcohol. Reduction by known methods gives α-(p-diphenyl)-β-(p-hydroxyphenyl)propionic acid melting at 245–246° C. after recrystallization from ethanol.

Iodination by the method of Example IX gives the diiodo acid melting at 210–211° C. after recrystallization from aqueous ethanol.

EXAMPLE XII

*α-(1,2,3,4-Tetrahydro-1-naphthyl)-β-(3,5-diiodo-4-hydroxyphenyl)-propionic acid*

The intermediate, α-(1,2,3,4-tetrahydro-1-naphthyl)-β-(p-hydroxyphenyl)-propionic acid, is made from α-(1-naphthyl)-p-hydroxycinnamic acid by reduction with Raney's alloy and aqueous alkali. Iodination in accordance with the procedure of Example IX gives the diiodo acid.

EXAMPLE XIII

*α-(5,6,7,8-Tetrahydro-2-naphthyl)-β-(3,5-diiodo-4-hydroxyphenyl)-propionic acid*

α-(2-Naphthyl)p-hydroxycinnamic acid, M. P. 234–236° C. is reduced with Raney's alloy and aqueous alkali gives the α-(5,6,7,8-tetrahydro-2-naphthyl)-β-(p-hydroxyphenyl)-propionic acid melting at 200° C. after recrystallization from benzene-petroleum ether.

Iodination in accordance with the method of Example IX gives the diiodo acid as a white crys-

EXAMPLE XIV

α-(1-Naphthyl)-2-hydroxy-5-bromo-cinnamic acid

Condensation of anhydrous potassium α-naphthylacetate and 5-bromosalicylaldehyde by the procedure of Example VIII gives this substituted cinnamic acid.

EXAMPLE XV

Ethyl-α-(1-naphthyl)-3,5-dichloro-4-hydroxycinnamate

Esterification of the acid of Example III with ethyl alcohol with acetyl chloride as catalyst gives the ester of this example melting at 109–110° C. after recrystallization from chloroform-petroleum ether or aqueous ethanol.

EXAMPLE XVI

α-(1-Naphthyl)-3,5-dichloro-4-methoxy-cinnamic acid

Methylation of the compound of Example III with dimethyl sulfate in alkaline solution yields the compound of this example melting at 235–236° C. after recrystallization from ethanol.

Condensation of anhydrous sodium α-naphthylacetate and 3,5-dichloro-4-methoxybenzaldehyde in acetic anhydride as described in the previous examples also gives the dichloromethoxy compound of this example in good yield.

The term "halogen" as used in the specification and claims hereof is intended to denote chlorine, bromine and iodine.

This application is a continuation-in-part of our copending application, Serial No. 699,594, filed September 26, 1946, now abandoned, and contains subject matter in common with our copending applications, Serial No. 690,070, filed August 12, 1946, now Patent No. 2,475,718, and Serial No. 20,107, filed April 9, 1948.

We claim:

1. Compounds of therapeutic activity of the formula

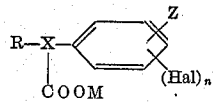

wherein R is a polycyclic radical of the group consisting of naphthyl, tetralyl and diphenyl radicals, X is an aliphatic hydrocarbon chain of two carbon atoms, Hal is halogen having an atomic number not less than 17 and not greater than 53, $n$ is 1 to 3, the halogens being only in the ortho and para positions to the hydroxyl group, Z is a member of the group consisting of hydroxy and lower alkoxy groups, and M is a member of the group consisting of hydrogen, lower alkyl groups, and alkali and alkaline earth metals, R and COOM being attached to the same carbon atom of X and the phenyl ring to the other carbon atom.

2. Compounds as defined in claim 1 wherein R is naphthyl.

3. Compounds as defined in claim 1 wherein R is tetralyl.

4. Compounds as defined in claim 1 wherein R is diphenyl.

5. Compounds as defined in claim 1 wherein Hal is iodine.

6. Compounds as defined in claim 1 wherein Hal is bromine.

7. Compounds as defined in claim 1 wherein Hal is chlorine.

8. α-(1-Naphthyl)-3,5-diiodo-4-hydroxycinnamic acid.

9. α-(2-Naphthyl)-3,5-diiodo-4-hydroxycinnamic acid.

10. α-(5.6.7.8-Tetrahydro-1-naphthyl)-β-(3,5-diiodo-4-hydroxyphenyl)-propionic acid.

11. In the manufacture of halogenated polycyclic aryl aliphatic acids the step which comprises heating a halogenated hydroxyaryl aldehyde of the general formula

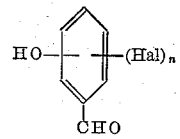

wherein Hal is a halogen having an atomic number not less than 17 and not greater than 53 and $n$ is 1 to 3, the halogens being only in the ortho and para positions to the hydroxyl group with a member of the group consisting of naphthyl-, tetralyl- and diphenyl-acetic acids and their alkali metal salts in the presence of an organic dehydrating agent until condensation is affected.

12. A process as defined in claim 11 wherein the hydroxyl is in the 4-position and halogens are in the 3- and 5-positions.

13. A process as defined in claim 11 wherein the aldehyde is 3,5-diiodo-4-hydroxybenzaldehyde.

14. α-(1-Naphthyl)-3,5-dichloro-4-hydroxycinnamic acid.

15. α-(p-Diphenyl)-β-(3,5-diiodo-4-hydroxyphenyl)-propionic acid.

DOMENICK PAPA.
ERWIN SCHWENK.

REFERENCES CITED

The following references are of record in the file of this patent:

UNITED STATES PATENTS

| Number | Name | Date |
|---|---|---|
| 2,345,384 | Dohrn et al. | Mar. 28, 1944 |
| 2,348,231 | Strain et al. | May 9, 1944 |

FOREIGN PATENTS

| Number | Country | Date |
|---|---|---|
| 559,024 | Great Britain | Feb. 1, 1944 |

OTHER REFERENCES

Adams et al., "Organic Reactions" (Wiley, 1942), vol. 1, pp. 211–227, 240–241.